US006569797B1

(12) United States Patent
Brosnan

(10) Patent No.: US 6,569,797 B1
(45) Date of Patent: May 27, 2003

(54) LOW DENSITY CERAMICS PRODUCED FROM PAPER RECYCLING RESIDUALS

(75) Inventor: Denis A. Brosnan, Clemson, SC (US)

(73) Assignee: Clemson University, Clemson, SC (US)

( * ) Notice: Subject to any disclaimer, the term of this patent is extended or adjusted under 35 U.S.C. 154(b) by 0 days.

(21) Appl. No.: 09/715,812

(22) Filed: Nov. 17, 2000

(51) Int. Cl.$^7$ ............................................... C04B 38/00
(52) U.S. Cl. ........................... 501/155; 501/80; 501/81; 501/82; 501/83; 264/44
(58) Field of Search ............................. 501/80, 81, 82, 501/83, 155; 264/44

(56) References Cited

U.S. PATENT DOCUMENTS

| | | | | |
|---|---|---|---|---|
| 3,591,393 | A | * 7/1971 | Rankine | 501/81 |
| 4,012,262 | A | 3/1977 | Patterson et al. | 106/38.22 |
| 4,545,568 | A | * 10/1985 | Rithfuss et al. | 501/83 |
| 4,605,594 | A | 8/1986 | Owens et al. | 428/373 |
| 5,252,525 | A | * 10/1993 | Gonzales et al. | 501/81 |
| 5,268,131 | A | * 12/1993 | Harrison | 264/44 |
| 5,369,063 | A | * 11/1994 | Gee et al. | 501/82 |
| 5,685,932 | A | 11/1997 | Stohr et al. | 156/89 |
| 5,726,111 | A | * 3/1998 | Gault | 501/155 |
| 5,772,937 | A | 6/1998 | Cohen et al. | 264/117 |

FOREIGN PATENT DOCUMENTS

DE 19654532 * 7/1998

* cited by examiner

Primary Examiner—Karl Group
(74) Attorney, Agent, or Firm—Leigh P. Gregory

(57) ABSTRACT

An improved method for preparing low density ceramics is described wherein the process incorporates paper residuals which are a by-product of the paper recycling process. The method for making a low density-ceramic comprises the steps of:

a) providing a paper residual comprising from about 0.5 to about 99 percent, by weight, of at least one filler, from about 0 to about 20 percent, by weight, of a dye, from about 0 to about 10 percent, by weight, of an ink, from about 0.5 to about 99.5 percent, by weight, of paper fiber, and from about 0 to about 30 percent, by weight, of other components, based on a dry weight of the residual;

b) admixing a ceramic material with the paper residual, the ceramic material comprising up to about 90%, by weight, of the admixture, based on a dry weight of the admixture;

c) forming the admixture into a desired shape; and d) firing the admixture to a temperature ranging from about 1850° F. to about 2900° F.

15 Claims, No Drawings

LOW DENSITY CERAMICS PRODUCED FROM PAPER RECYCLING RESIDUALS

BACKGROUND OF THE INVENTION

This invention is directed to a method for forming ceramics. More specifically, this invention is directed to a method for forming ceramics from paper residuals which are produced in the recycling of waste paper.

It has become common practice to recycle paper. This has advantages in both cost and environmental impact. The paper recycle process typically yields two dominant fractions—paper fiber and paper residue. The paper fibers are reintroduced into the paper manufacturing process or utilized in the formation of refractory materials as described, for example, in U.S. Pat. No. 4,012,262. The paper residue fraction typically includes residual paper fibers and ceramic substances such as, for example, kaolin clay and ground calcium carbonate. Heretofore, the paper residue has been found to be of little commercial value.

The amount of paper fiber which is entrained in the paper residue fraction can generally be as high as 50–70%, by weight. Because of its limited commercial value, a large percentage of residue material is sent to landfills which is undesirable. Land-filling of the residuals is not only undesirable for the environment but the cost associated with disposal is a considerable expense to generators of the residual. The full financial and environmental impact of paper recycling cannot be realized until some commercial use of the paper residual is developed.

The manufacture of insulating firebrick is well known in the art. There are two predominant methods employed depending on the density and porosity of firebrick desired.

In one method of forming firebrick, mixtures are made of kaolin clay, sawdust and a gypsum ($CaSO_4 2H_2O$) binder. The mixture hardens to a low density mass which is formed and fired. The firing causes combustion of the saw dust leaving a porous ceramic. A particular problem associated with this material is the incorporation of gypsum which liberates sulfur dioxide and sulfur trioxide when fired. The sulfur compounds, collectively known as $SO_x$, are highly undesirable and must be removed from the emission stack by scrubbing or the amount of material manufactured must be limited to remain under legal limits of $SO_x$ emissions. There has been a long felt desire in the art to modify, or eliminate, this process in favor of one which has lower $SO_x$ emissions.

In another method of forming firebrick a previously fired lightweight refractory aggregate is mixed with natural clays. The mixture is made into an appropriate shape by conventional methods, such as extrusion or pressing, and the shaped mixture is fired. This produces a higher density product which has inferior insulating properties to the aforementioned process. One advantage is the lower level of undesirable emissions.

Previously, the artisan has been forced to rely on methods which either generate undesirable emissions or materials with inferior insulating capabilities.

There has been a long felt need in the art to provide a method for manufacturing insulating firebrick which has adequate insulating capabilities and yet does not emit undesirable elements into the environment. The present invention provides such a process.

In another field of technology, solid-gas separations are usually conducted by a number of techniques involving the use inertial devices, such as cyclone separators, and filtration devices. In air pollution control equipment, a common technique is to use fabric filters in devices called collectively "bag houses," which are well known in the art.

One problem with bag houses is that most conventional filtration materials cannot be used for gases exhibiting temperatures above 500° F. For example, cotton cloth filters can be used up to 180° F., Teflon® can be used to 450° F., and fiberglass filters are appropriate for use up to 500° F.

In some cases, it is practically impossible to reduce the temperature of input gases below 500° F., or cold air must be injected in order to reduce the temperature of process exhaust. The latter practice necessitates large additional expense as a control device must be employed which has sufficient capacity to clean the larger total volume of input gas. Thus, there is a great need in the area of filtration technology for filtration materials and devices which are capable of withstanding temperatures above 500° F.

SUMMARY OF THE INVENTION

Advantageously, the present invention provides a method for forming a ceramic which utilizes paper residuals.

It is also an advantage of the present invention that a method for forming a ceramic which has substantially low levels of sulfur compounds released during the manufacturing process is provided.

A particular feature of the present invention is that the properties of the material are substantially identical to previous materials which utilize gypsum and sawdust to form a calcium alumino-silicate ceramic.

It is a further advantage of the present invention that it provides a method for making a variety of insulating materials including insulating firebrick.

It is yet another advantage of the present invention that it provides a method for making novel filtration devices which are capable of high temperature solid-gas filtration.

These and other advantages, as will be realized, are provided in a method for making a low density ceramic. The method comprises the steps of:

a) providing a paper residual comprising from about 0.5 to about 99 percent, by weight, of at least one filler, from about 0 to about 20 percent, by weight, of a dye, from about 0 to about 10 percent, by weight, of an ink, from about 0.5 to about 99.5 percent, by weight, of paper fiber, and from about 0 to about 30 percent, by weight, of other components, based on a dry weight of the residual;

b) admixing a ceramic material with the paper residual, the ceramic material comprising up to about 90%, by weight, of the admixture, based on a dry weight of the admixture;

c) forming the admixture into a desired shape; and d) firing the admixture to a temperature ranging from about 1850° F. to about 2900° F.

Another embodiment is provided in a method for making a lightweight aggregate comprising the steps of:

a) providing a paper residual comprising from about 10 to about 99 percent, by weight, of kaolin clay, from 0 to about 50 percent, by weight, calcium carbonate, and from about 0.5 to about 70 percent, by weight, paper fiber, based on a dry weight of the paper residual;

b) forming the paper residual into a temporary shape; and c) firing the shaped paper residual to a temperature ranging from about 1850° F. to about 2900° F.

Yet another embodiment is provided in a method for making a ceramic material comprising the steps of:
  a) providing a paper residual comprising from about 0.5 to about 99 percent, by weight, of at least one filler, from about 0 to about 20 percent, by weight, of a dye, from about 0 to about 10 percent, by weight, of an ink, from about 0.5 to about 99.5 percent, by weight, of paper fiber, and from about 0 to about 30 percent, by weight, of other components, based on a dry weight of the residual;
  b) forming the paper residual into a temporary shape;
  c) firing the shaped paper residual to a temperature ranging from about 1850° F. to about 2900° F. and pulverizing the fired mass to form a lightweight aggregate;
  d) admixing a ceramic substance with the lightweight aggregate, the ceramic substance comprising up to about 90 percent, by weight, of the admixture, based on a dry weight of the admixture;
  e) forming the admixture into a desired shape; and
  f) firing the admixture to a temperature range from about 1850° F. to about 2900° F.; whereby sulfur-containing compounds are not substantially released during either of step c or f.

A particularly preferred product prepared by the present invention is a firebrick comprising calcium alumina-silicate prepared by a process comprising the steps of:
  a) providing a paper residual comprising from about 0.5 to about 99 percent, by weight, of at least one filler, from about 0 to about 20 percent, by weight, of a dye, from about 0 to about 10 percent, by weight, of an ink, from about 0.5 to about 99.5 percent, by weight, of paper fiber, and from about 0 to about 30 percent, by weight, of other components, based on a dry weight of the residual;
  b) admixing a ceramic substance with the paper residual, the ceramic substance comprising up to about 90%, by weight, of the admixture, based on a dry weight of the admixture;
  c) forming the admixture into a desired shape; and
  d) firing the admixture to a temperature ranging from about 1850° F. to about 2900° F.

DETAILED DESCRIPTION OF PREFERRED EMBODIMENTS

The present invention incorporates a paper residual in the manufacture of low density ceramics. As discussed above, paper residual is a by-product of the recycle process for paper. In the recycle operation the paper fibers are removed and reintroduced into the paper manufacturing process. The paper residual which remains comprises a certain percentage of paper fiber, which can not be removed or which the recycler chooses not to remove, along with other substances. The composition and relative percentages of the other substances present in the paper residual will depend on the type of paper being recycled, the source of the paper, and the efficiency of the paper recycling process.

Most basically, different types of paper are formed from different components and differing blends of components. For example, the Kraft paper which is used for brown paper bags has a composition which differs significantly from that of a slick, shiny paper employed in a magazine. The chemical composition of paper is determined by the types of fibers used and by any nonfibrous substances incorporated in and applied to the paper during the papermaking or subsequent converting operations. Paper usually is made from cellulose fibers obtained from the pulping of wood. Occasionally, synthetic fibers and cellulose fibers from other plant sources are used. In accordance with the present invention, paper residual derived from paper containing cellulose fibers obtained from wood or other plant sources is preferred.

Furthermore, the present invention requires paper residual which contains from about 0.5 to about 70 percent by weight (based on a dry weight of the residual) of such cellulosic fibers. Other nonfibrous substances which have been incorporated in or applied to the paper during the papermaking or converting processes or which have been introduced to the paper as a foreign substance or contaminant prior to the recycling process will comprise the remaining 30 to 99.5 percent of the residual. As above, the relative composition of such nonfibrous fraction of the residual will depend on the type of paper being recycled, the source of the paper and the efficiency of the recycling process. The most common nonfibrous components of the paper residuals are fillers and pigments, dyes, and inks, although other components, both from the papermaking and converting processes and from other sources, are often present. Depending on the efficiency of the recycling process, a fibler may be present in amounts ranging from 0.5 to 99 percent, by weight, of the residual based on a dry weight. Dyes may or may not be present depending on the type of paper being recycled and, if present, may comprise up to about 20 percent by weight of the residual depending on the efficiency of the recycling process. Similarly, ink may or may not be present depending on the specific paper being recycled and, if present, may comprise up to about 10 percent, by weight, of the residual depending on the efficiency of the recycling process. Other components may be present in amounts up to about 30 percent by weight of the residual.

Fillers which may be present in a paper residual for use in accordance with the present invention include clays such as kaolin clay and other pigments such as titanium dioxide, calcium carbonate, and zinc sulfide, as well as talc and synthetic silicates. Such materials are employed in the papermaking process to improve brightness, opacity, softness, smoothness and ink receptivity. Many of the materials which may be employed as fillers are mineral pigments.

In addition to pigments, organic dyes may be employed for coloring the paper and inks may be present if the paper is printed.

Other components which may be found in the paper residual include other substances which may be employed in the papermaking and converting processes and foreign substances. The former group may include sizing agents such as rosin, various hydrocarbon and natural waxes, starches, glues, casein, asphalt emulsions, synthetic resins and cellulose derivatives; bonding agents such as starches, natural gums, modified cellulose, and amino resins; barrier coating such as paraffin wax, polyethylene, cellulose derivatives, rubber derivatives, butadiene-styrene copolymers, vinyl copolymers, polyvinylidene chloride copolymers, polyamides, polyesters, and alkyds; and other additives which are well known in the papermaking art. Foreign substances may includes glues, plastic wrappers and any of a variety of contaminants depending on the source of the paper being recycled.

The water content of the paper residual can be adjusted to provide the proper rheological properties if desired. Water can be added to increase the flow rate of the paper residual as would be necessary if intricate shapes and designs are to be formed or the water content can be lowered, by drying, for example in a kiln of convection dryer, if a shorter firing time is desired.

It is often desirable to alter the properties of the final product by forming an admixture prior to firing. Basically, the process step is a means of adjusting the relative composition of the paper residual in order to achieve the desired ratio of paper fiber to ceramic substances for achieving a particular, desired end product. If the fiber fraction of the residual is low with respect to the filler fraction, additional paper fibers may be added. Similarly, if the filler fraction of the residual is low with respect to the fiber fraction additional ceramic substances may be added. The fiber to filler (or ceramic) ratio will determine the density of the end product and may be adjusted in order to achieve a desired density. Preferably, the admixture may include additional ceramic substances in an amount up to about 90%, by weight, based on the total weight of the added ceramic substances and the paper residual. Any additional ceramic substance is preferably a compound chosen from the group consisting of kaolin, ball clay, bentonite, fireclay, shale, aluminum oxide, talc, pyrophyllite, silica, calcium carbonate, and magnesium oxide. In addition to one or more additional ceramic substances the admixture may contain additives which can impart certain properties to the product after manufacture. Particularly preferred additives to the admixture are ceramic aggregates and binders. Ceramic aggregates are preferably chosen from a group consisting of calcined clay, expanded clay, diatomite, insulating firebrick aggregate, bautite and raw kyanite. Binders are preferably chosen from a group consisting of sodium silicate, aluminum sulfate, potassium silicate, portland cement, calcium aluminate cement, colloidal silica and organic binders. Preferred organic binders are chosen from the group consisting of starches and lignins.

The paper residual and additives, if present, can be formed into a shape by any of the techniques known in the art. The shape may represent the final article or a temporary shape may be formed which can later be pulverized for use in subsequent manufacturing steps.

To reach the desired properties the paper residual, and optional additives, must be fired to remove water and to form interconnected pores which provide insulating and other valuable properties to the ceramic product. While not limited to any theory, it is hypothesized that the firing process oxidizes the paper fibers which are present in the pre-fired paper residual. The vacancies left by the paper fibers form interconnected pores which are advantageous to the properties of the ceramic. For some end products it is preferable that pores which are not interconnected are formed. Such isolated pores can be achieved by, for example, adding a glass to the above-discussed admixture.

The temperature at which the material is fired must be sufficient to oxidize the paper fibers and vaporize any water present in the mixture as well as forming a ceramic bond phase within the material. A temperature range of 1850° F. to 2900° F. is suitable for achieving these goals. The time required to adequately fire a specimen depends on the shape and size of the specimen. A smaller specimen can be fired in less time than a large specimen since the interior reaches optimum temperature sooner for a small specimen and water vapor has less material to diffuse through. In any case, it is most desirable to fire the specimen long enough that the weight becomes nearly constant. This insures that the maximum amount of material has been oxidized or removed by vaporization from the specimen. After firing, the porosity of the resultant ceramic depends, in part, on the amount of paper fiber entrained in the paper residual. An ancillary advantage of the present invention is that such high temperature firing results in the removal of hazardous metals, which may be found in certain components of the residuals such as, for example, inks. Alternatively, the process can be adjusted such that hazardous metals are entrained, and therefore safely contained, within the ceramic being produced.

A ceramic prepared as described in the manner described herein is well suited for use as an insulating firebrick, the application of which is well documented. The properties of the ceramic are also well suited for secondary processing wherein a higher density ceramic may be formed.

As an additional benefit a ceramic prepared in the manner described herein does not liberate $SO_x$ to the degree common in the art. Sulfur containing compounds are not substantially released during the firing. The amount of sulfur released from firing of the material is less than 5%, when measured as $SO_2$, based on the weight of the paper residue and more preferably less than 1%, when measured as $SO_2$, based on the weight of the paper residue.

In the secondary processing a ceramic prepared from a paper residual and optional admixtures is pulverized. The pulverized ceramic may be screened, as known in the art, to separate the material by particle size. If desired, the ceramic can be used in the pulverized form.

In a particularly preferred embodiment the pulverized ceramic and an additional ceramic substance clay are combined to form an admixture wherein the ceramic substance represents up to about 90%, by weight of the admixture. The admixture is then formed into a desired shape and fired at a temperature of about 1850° F. to about 2900° F.

Other end use applications for low density ceramics prepared in accordance with the present invention include a variety of insulating materials and filtration devices. Porous filters formed by the present inventive method are particularly suited for high temperature filtration applications.

A filtration device in accordance with the present invention may be made by forming a formable mass or slurry of the above-described admixture of paper residual and one or more additional ceramic substances depending on the filler to fiber ratio of the residual being used. The formable mass is spread over a screen that is affixed to a vacuum device. The formable mass is spread over the screen to a desired thickness with the vacuum subsequently applied. The vacuum removes excess water. The mass can be removed from the screen support and dried, or the screen with overlaid mass can be placed into a dryer to remove residual water. Binders in the composition, which are either present in the residual or added to the admixture as discussed above, impart temporary or permanent strength after drying. The mass is subsequently heat treated or fired, substantially as discussed above, to achieve a required strength, porosity and permeability to function as a filtration device.

This technique may be employed to produce a flat or rectangular filter, or it may be used to produce a "cup" shaped or "bag-like" filter. The advantage of such a filter is its use at temperatures above 500° F. and extending up to about 3200° F., as may be possible through adjustment of the ceramic composition of the article. That is, it is an important aspect of the present invention that, regardless of the specific end-use application, the composition of mass to be formed may be adjusted to produce a ceramic usable under a variety of thermal and corrosive conditions. For hot gas filtration, objects with high durability can be produced by known techniques of reducing the thermal expansion coefficient. For liquid-solid separations, highly vitrified masses of advanced purity may be desirable.

An alternative method for forming a filtration device in accordance with the present invention the slurry of formable mass may be projected through a series of rollers producing a thin, rectangular shape. As a further alternative, the mass may be compacted in an impervious mold or in a permeable mold, in a manner well known in the art, to produce the filter shape. The shape is subsequently dried and fired to produce the filtration device.

As is known in the art, the ceramic filter can be affixed within a frame to be held in an air pollution control device. A plurality of such filters may be used to affect gas cleansing.

Although the invention has been described with reference to its preferred embodiments, those of ordinary skill in the art may, upon reading this disclosure, appreciate changes and modifications which may be made and which do not depart from the scope and spirit of the invention as described above and claimed below.

What is claimed is:

1. A method for making a low density ceramic comprising the steps of:
   providing a paper residual comprising
      from about 0.5 to about 99 percent, by weight, of at least one filler,
      from about 0 to about 20 percent, by weight, of a dye,
      from about 0 to about 10 percent, by weight, of an ink,
      from about 0.5 to about 99.5 percent, by weight, of paper fiber, and
      from about 0 to about 30 percent, by weight, of other components, based on a dry weight of the residual;
   admixing a ceramic substance with the paper residual, the ceramic substance comprising up to about 90 percent, by weight of the admixture, based on a dry weight of the admixture;
   forming the admixture into a desired shape; and
   firing the admixture to a temperature ranging from about 1850° F. to about 2900° F.

2. The method set forth in claim 1 wherein the filler comprises at least one member selected from the group consisting of kaolin clay, titanium dioxide, calcium carbonate, zinc sulfide, talc and synthetic silicates.

3. The method set forth in claim 1 further including the step of drying the admixture prior to firing.

4. The method set forth in claim 1 further including the step of dewatering the paper residual prior to admixing the ceramic substance with the paper residual.

5. The method set forth in claim 1 further including the step of adding water to the paper residual prior to admixing the ceramic substance with the paper residual.

6. The method set forth in claim 1 wherein the ceramic substance is selected from a group consisting of kaolin, ball clay, bentonite, fireclay, shale, aluminum oxide, talc, pyrophyllite, silica, calcium carbonate, and magnesium oxide.

7. The method set forth in claim 1 wherein the admixture further includes a ceramic aggregate.

8. The method set forth in claim 7 wherein the ceramic aggregate is selected from a group consisting of calcined clay, expanded clay, diatomite, insulating firebrick aggregate, bautite, and raw kyanite.

9. The method set forth in claim 1 wherein the admixture further includes a binder.

10. The method set forth in claim 9 wherein the binder is selected from a group consisting of sodium silicate, aluminum sulfate, potassium silicate, portland cement, calcium aluminate cement, colloidal silica and organic binders.

11. The method set forth in claim 10 wherein the organic binders are selected from a group consisting of starches, and lignins.

12. A method for making a lightweight aggregate comprising the steps of:
    providing a paper residual comprising
       from about 0.5 to about 99 percent, by weight, of at least one filler,
       from about 0 to about 20 percent, by weight, of a dye,
       from about 0 to about 10 percent, by weight, of an ink,
       from about 0.5 to about 99.5 percent, by weight, of paper fiber, and
       from about 0 to about 30 percent, by weight, of other components, based on a dry weight of the residual;
    forming the paper residual into a temporary shape; and
    firing the shaped paper residual to a temperature ranging from about 1850° F. to about 2900° F.

13. The method set forth in claim 12 further including the step of pulverizing the fired mass, thereby forming aggregate particles.

14. The method of claim 13 further including the step of screening the pulverized mass, thereby sorting the aggregate particles by size.

15. A method for making a ceramic material comprising the steps of:
    providing a paper residual comprising
       from about 0.5 to about 99 percent, by weight, of at least one filler,
       from about 0 to about 20 percent, by weight, of a dye,
       from about 0 to about 10 percent, by weight, of an ink,
       from about 0.5 to about 99.5 percent, by weight, of paper fiber, and
       from about 0 to about 30 percent, by weight, of other components, based on a dry weight of the residual;
    forming the paper residual into a temporary shape;
    firing the shaped paper residual to a temperature ranging from about 1850° F. to about 2900° F. and pulverizing the fired mass to form a lightweight aggregate;
    admixing a ceramic substance with the lightweight aggregate, the ceramic substance comprising up to about 90 percent, by weight, of the admixture, based on a dry weight of the admixture;
    forming the admixture into a desired shape; and
    firing the admixture to a temperature range from about 1850° F. to about 2900° F.;
    whereby sulfur-containing compounds are not substantially released during either of the two firing steps.

* * * * *